(12) United States Patent
Lin

(10) Patent No.: US 8,245,631 B2
(45) Date of Patent: Aug. 21, 2012

(54) FORMING MACHINE FOR FORMING DOUGH INTO A SHEET

(76) Inventor: Chao-Hung Lin, Taipei County (TW)

( * ) Notice: Subject to any disclaimer, the term of this patent is extended or adjusted under 35 U.S.C. 154(b) by 466 days.

(21) Appl. No.: 12/627,774

(22) Filed: Nov. 30, 2009

(65) Prior Publication Data

US 2010/0229732 A1    Sep. 16, 2010

(30) Foreign Application Priority Data

Mar. 12, 2009    (TW) ................................ 98203801 U

(51) Int. Cl.
  *A21C 3/00*    (2006.01)
  *A47J 37/00*    (2006.01)
  *A23L 1/00*    (2006.01)
(52) U.S. Cl. .............. 99/353; 99/349; 99/423; 425/374; 100/156; 100/210
(58) Field of Classification Search ............... 99/349, 99/353, 355, 423, 443 C; 425/112, 363, 425/374; 100/155 R, 156, 210
See application file for complete search history.

(56) References Cited

U.S. PATENT DOCUMENTS

| | | | | |
|---|---|---|---|---|
| 3,381,632 A | * | 5/1968 | Pontecorvo | 426/389 |
| 3,881,404 A | * | 5/1975 | Ohkawa | 99/353 |
| 4,241,648 A | * | 12/1980 | Longenecker | 99/349 |
| 4,576,682 A | * | 3/1986 | Laapotti | 162/358.3 |
| 5,441,342 A | * | 8/1995 | Konig et al. | 366/76.7 |
| 6,257,127 B1 | * | 7/2001 | Lin | 99/353 |

* cited by examiner

*Primary Examiner* — Reginald L Alexander
(74) *Attorney, Agent, or Firm* — Brinks Hofer Gilson & Lione

(57) ABSTRACT

A forming machine includes a drum having an outer heating surface, a reservoir disposed below the drum and having a surrounding wall with a top edge that can contact the outer heating surface and that has a profile conforming to that of the outer heating surface, an applying disk disposed inside the reservoir and having perforations, and a rotary shaft extending into the reservoir to rotate the applying disk and movable upwardly or downwardly to raise or lower the applying disk. The reservoir is movable between non-contact and contact positions, where the top edge is spaced below and moves upward to abut against the outer heating surface, respectively. The applying disk is movable between pre-applying and applying positions, where the applying disk is lowered into the reservoir for dipping into the dough and is raised for applying the dough to the outer heating surface, respectively.

15 Claims, 21 Drawing Sheets

FORMING MACHINE FOR FORMING DOUGH INTO A SHEET

CROSS-REFERENCE TO RELATED APPLICATION

This application claims priority of Taiwanese Application No. 098203801, filed on Mar. 12, 2009.

BACKGROUND OF THE INVENTION

1. Field of the Invention

This invention relates to a forming machine, more particularly to a forming machine for forming dough into a sheet.

2. Description of the Related Art

Currently, there are three main kinds of thin dough sheets available worldwide. One is made by using two rollers of a machine to press dough. The dough sheets formed therefrom are cut to shape so that the dough sheets can be used as dumpling wrappers and wanton wrappers when uncooked, and can be used as roasted duck wrappers, tortillas, and the like when heated and cooked. A second kind of thin dough sheet is made manually by spreading the dough onto a hot frying pan, after which the formed thin dough sheet is flipped to cook the other side thereof, thereby forming a crepe. A third kind of thin dough sheet is also made manually by spreading the dough onto a hot frying pan without flipping to form an uncooked spring roll wrapper.

However, the thickness and roundness of the thin dough sheets made from the aforementioned methods cannot be controlled. Further, it is difficult to mass produce the thin dough sheets using the aforementioned methods.

SUMMARY OF THE INVENTION

Therefore, the object of the present invention is to provide a forming machine that is capable of overcoming the aforementioned drawbacks of the prior art.

According to this invention, a forming machine for forming dough into a sheet comprises a heating unit and a dough applying unit. The heating unit includes a drum rotatable intermittently about a horizontal axis and having an outer heating surface. The dough applying unit includes a reservoir, an applying disk, and a rotary shaft. The reservoir is disposed below the drum, is adapted to contain the dough, and has a surrounding wall, and a bottom wall connected to a bottom end of the surrounding wall. The surrounding wall has a top edge that can contact the outer heating surface and that has a profile conforming to that of the outer heating surface. The bottom wall has a through hole. The reservoir is movable between a non-contact position, where the top edge is spaced below the outer heating surface, and a contact position, where the top edge moves upward to abut against the outer heating surface. The applying disk is disposed inside the reservoir and below the outer heating surface, and has perforations. The rotary shaft extends into the reservoir through the through hole to rotate the applying disk, and is movable upwardly or downwardly to raise or lower the applying disk. The applying disk is movable between a pre-applying position, where the applying disk is lowered into the reservoir for dipping into the dough, and an applying position, where the applying disk is raised for applying the dough to the outer heating surface.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
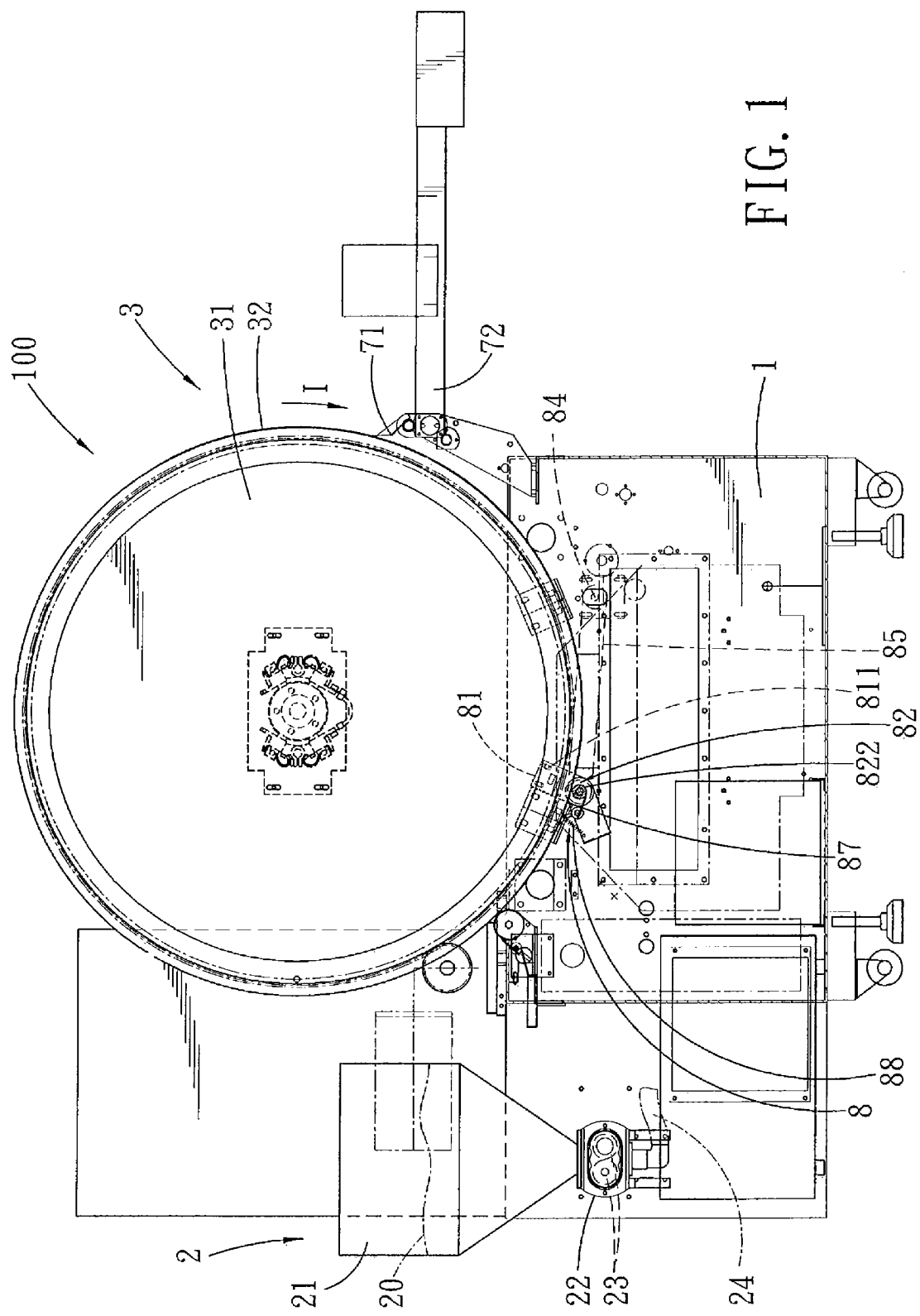
FIG. 1 is a schematic view of a forming machine according to the first preferred embodiment of this invention.
Figure 2:
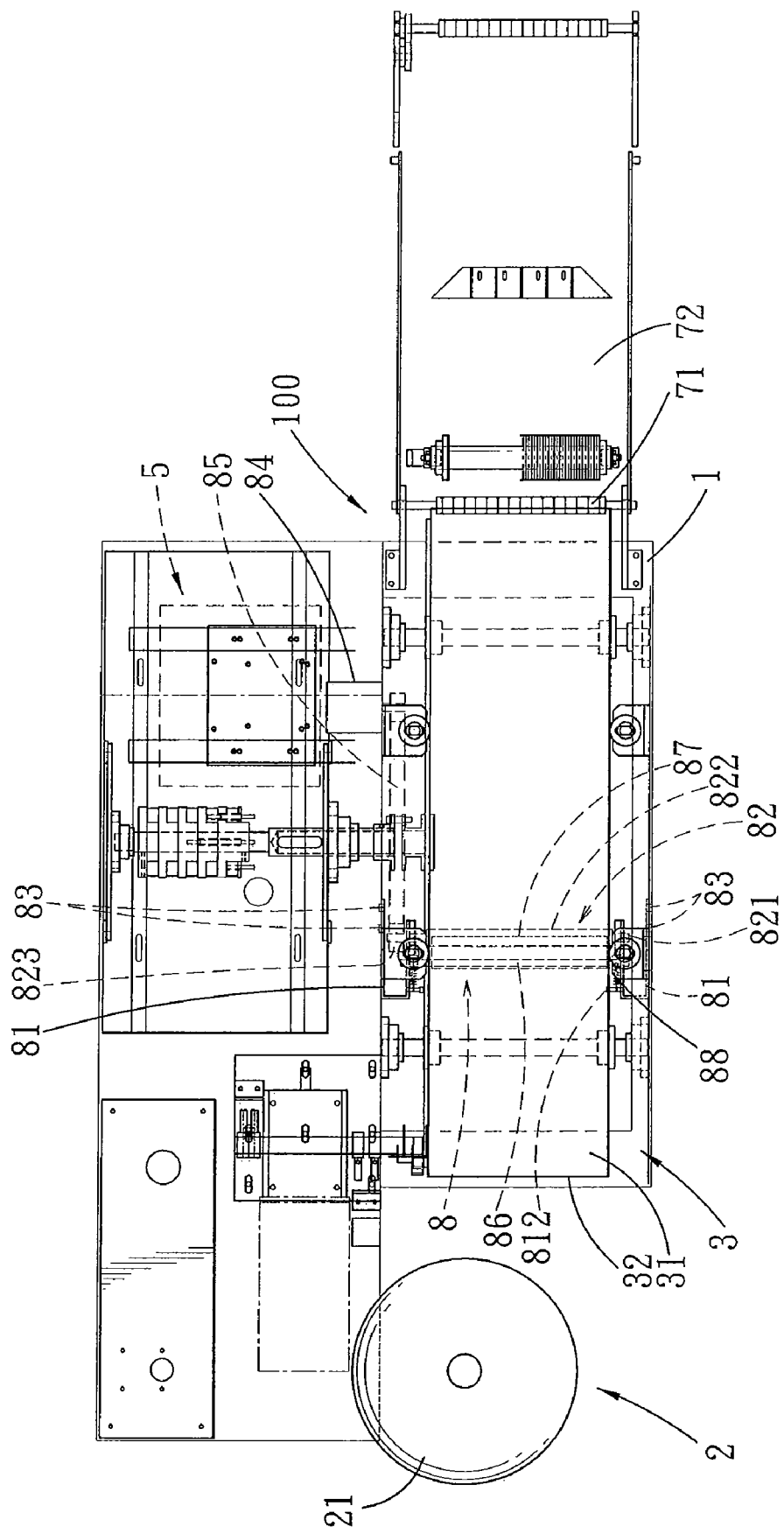
FIG. 2 is a schematic top view of the first preferred embodiment.

Before the present invention is described in greater detail, it should be noted that the same reference numerals have been used to denote like elements throughout the specification.

Referring to FIGS. 1 to 16, a forming machine 100 according to the first preferred embodiment of the present invention is shown to comprise a feeding unit 2, a heating unit 3, a dough applying unit 4, a drive unit 5, and a thickness control unit 8 all mounted to a machine body 1 of the forming machine 100.

The feeding unit 2 includes a feeder 21 for receiving cold dough 20, a casing 22 disposed downstream of and communicated fluidly with the feeder 21, two gear wheels 23 disposed in the casing 22 and meshing with each other, and a conveying tube 24 disposed downstream of the casing 22. The conveying tube 24 has two opposite ends connected fluidly and respectively to the casing 22 and the dough applying unit 4. Through opposite rotations of the gear wheels 23 in the casing 22, the dough 20 flowing to the casing 22 from the feeder 21 is squeezed, and extrudes out of the casing 22 into the conveying tube 24. The conveying tube 24 conveys the dough 20 to the dough applying unit 4.

The heating unit 3 includes a drum 31 having an outer heating surface 32. The drum 31 rotates intermittently about a horizontal axis so that the dough applying unit 4 can sequentially apply the dough 20 onto the outer heating surface 32. In this embodiment, the outer heating surface 32 has a curved profile.

Figure 3:
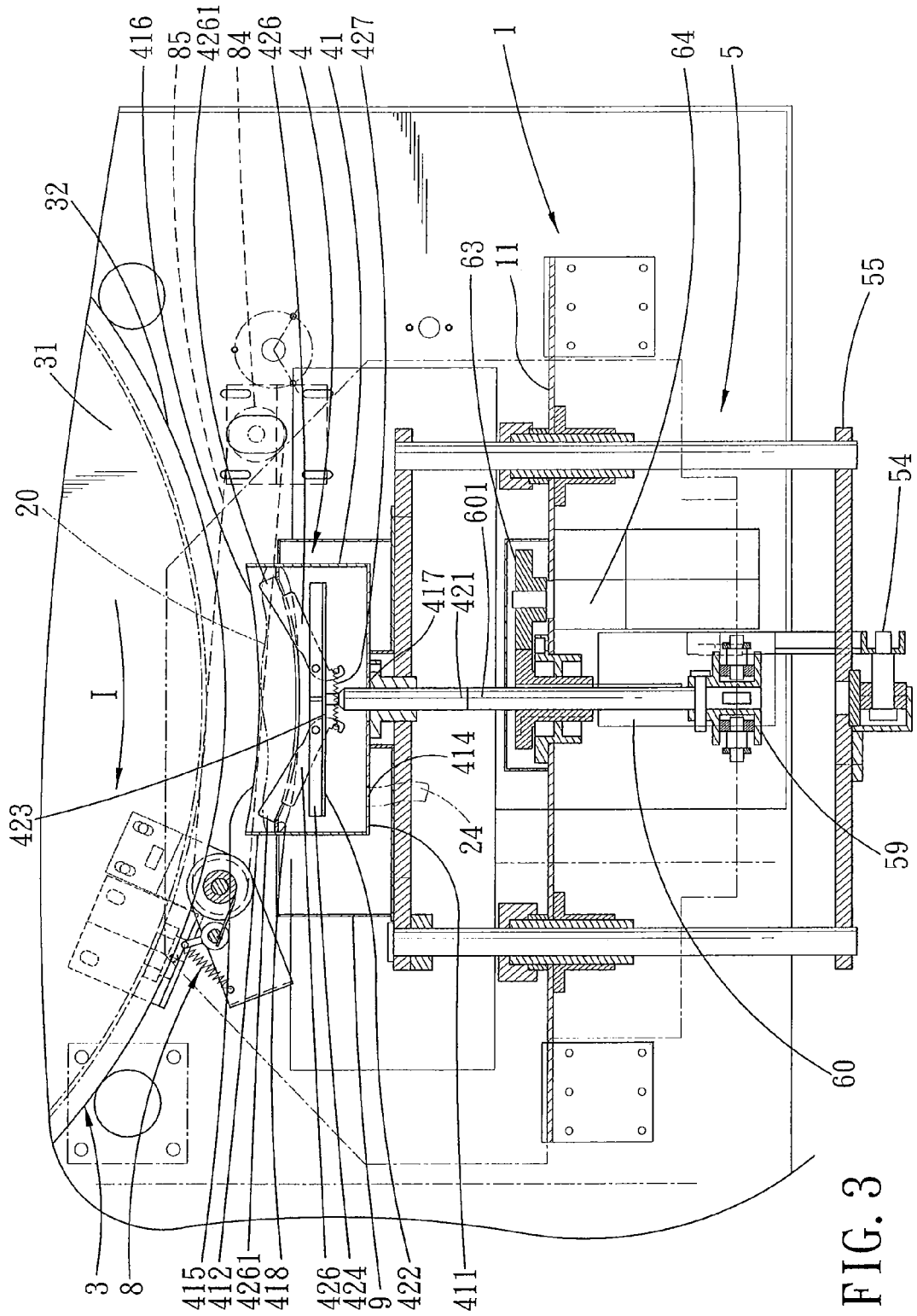
FIG. 3 is a fragmentary enlarged sectional view of the first preferred embodiment.
Figure 4:
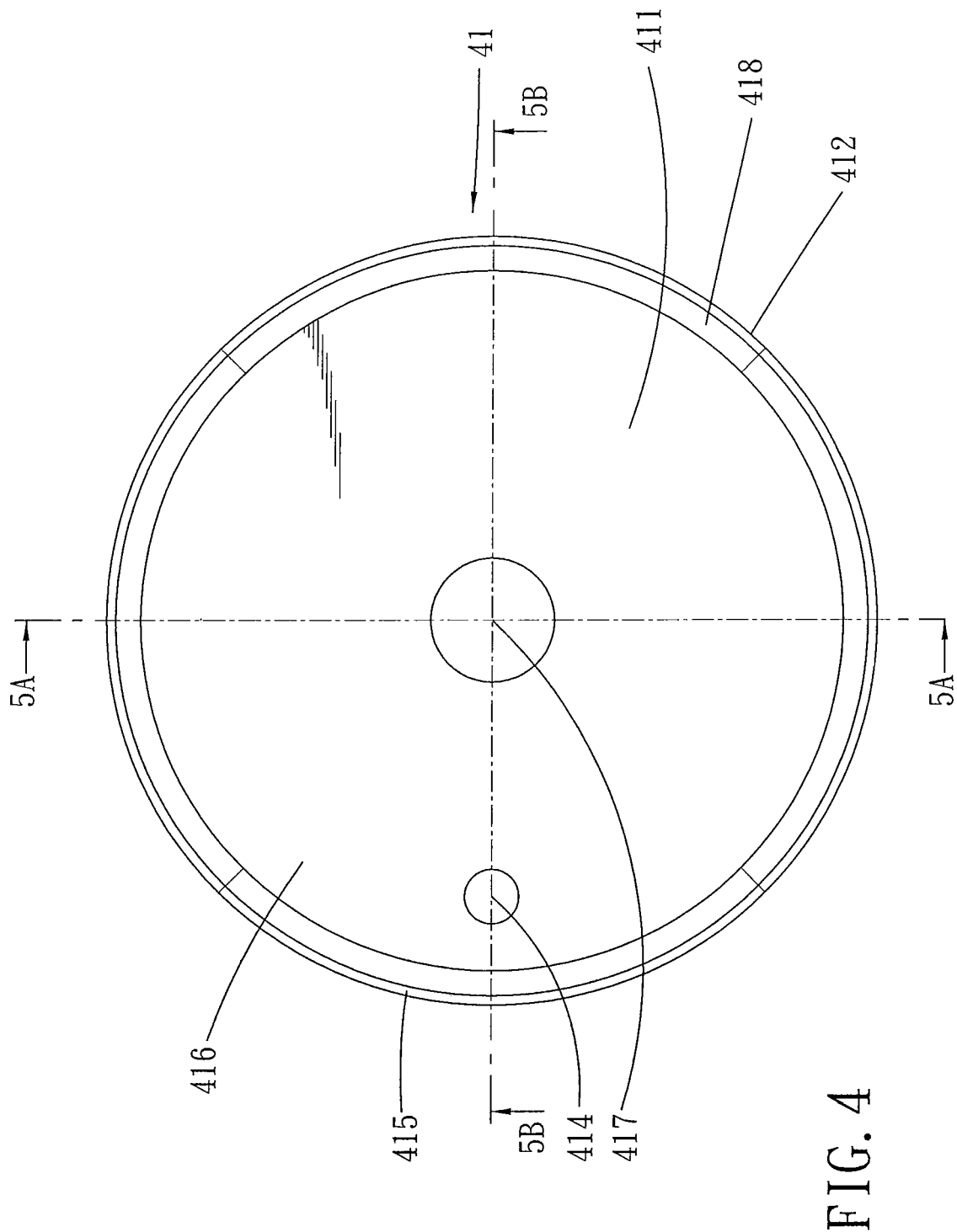
FIG. 4 is a schematic top view of a reservoir of the first preferred embodiment.
Figure 5A:
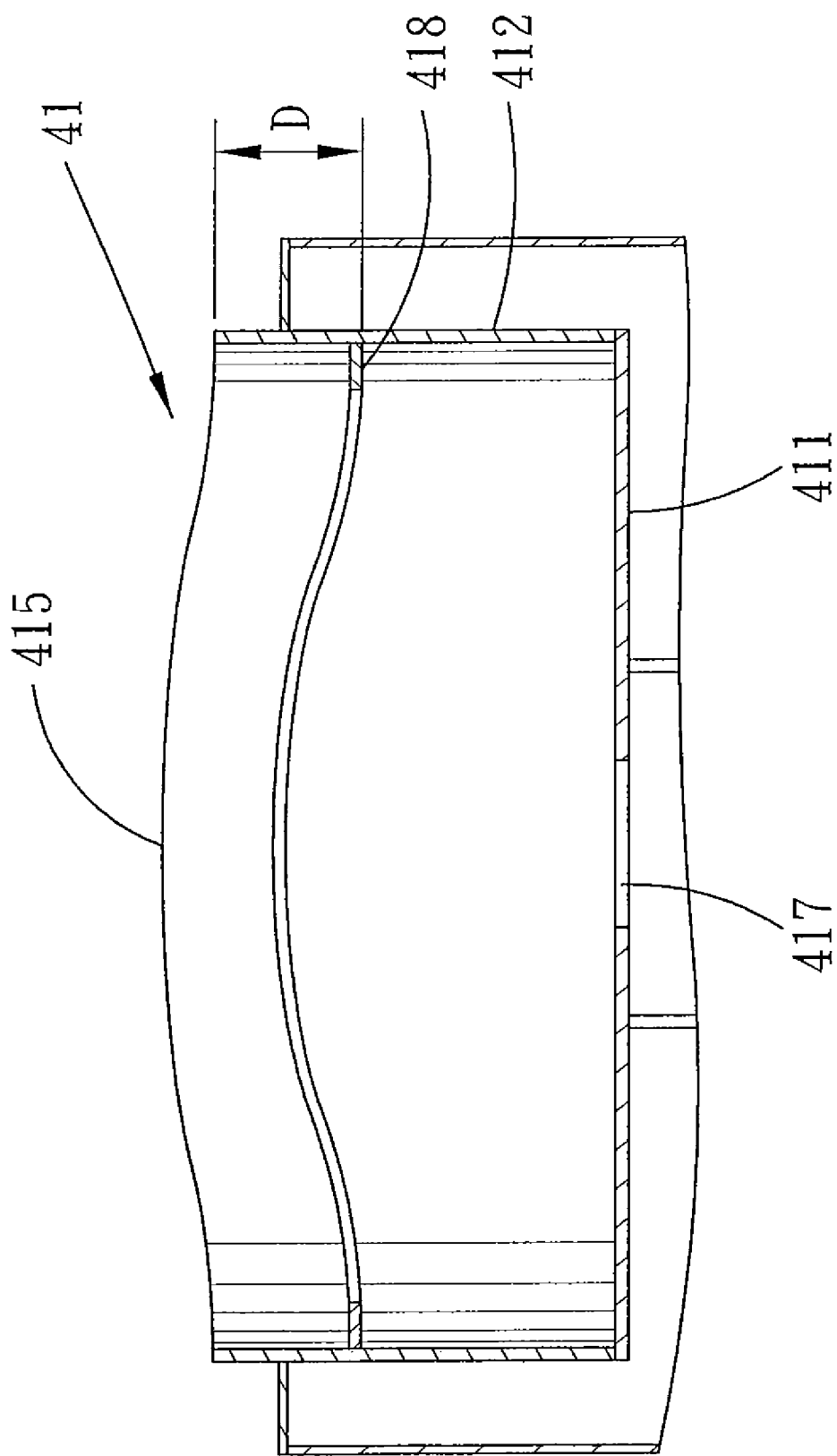
FIG. 5A is a fragmentary sectional view of the reservoir taken along line 5A-5A of FIG. 4.
Figure 5B:
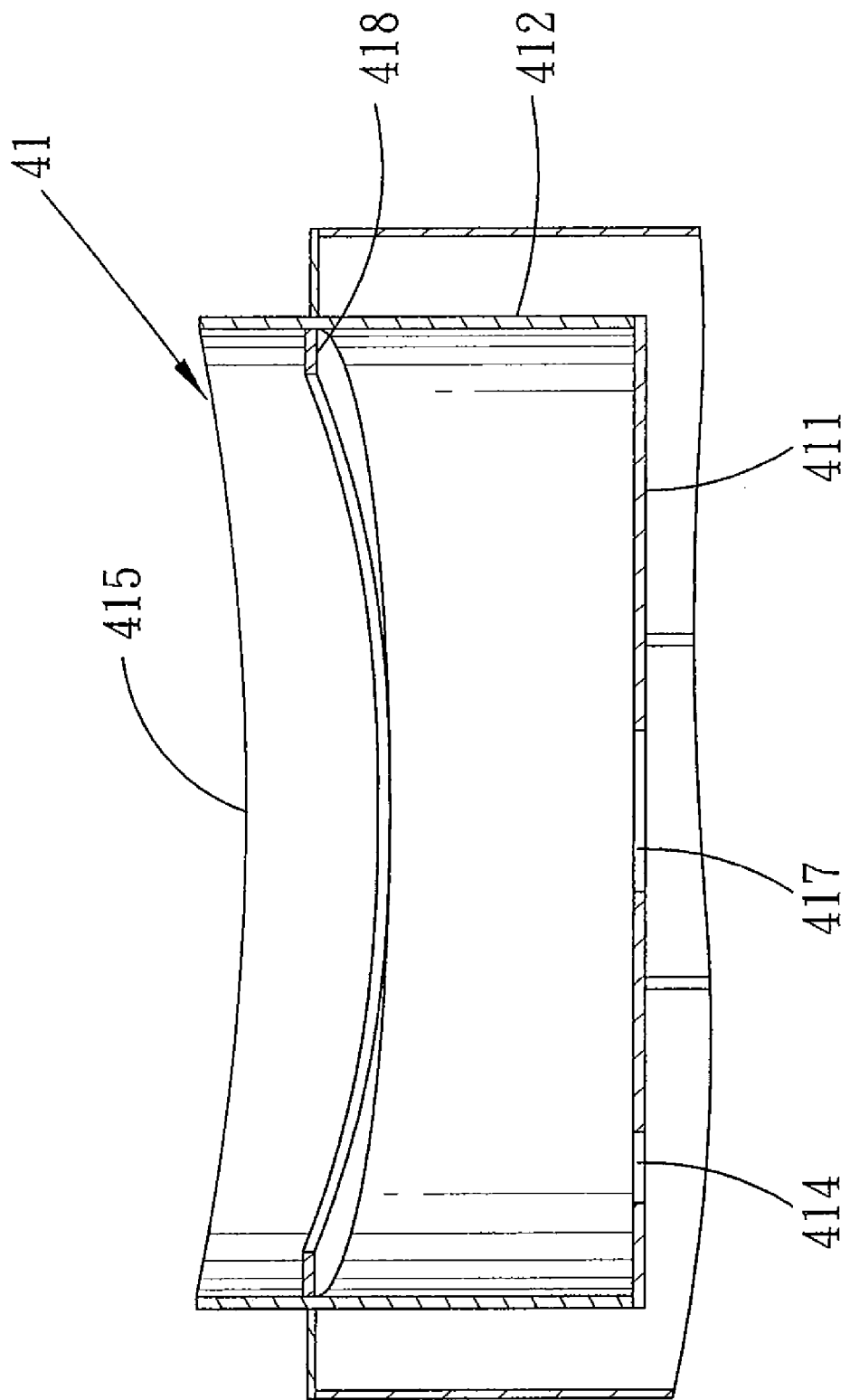
FIG. 5B is a fragmentary sectional view of the reservoir taken along line 5B-5B of FIG. 4.

With reference to FIGS. 3 to 5, the dough applying unit 4 includes a reservoir 41, a rotary shaft 421, and an applying disk 422. The reservoir 41 is disposed below the drum 31, and includes a bottom wall 411 having a central through hole 417 and a side through hole 414, and a surrounding wall 412 extending upwardly from an outer end of the bottom wall 411 and having a top edge 415 that defines an opening 416. The other end of the conveying tube 24 is connected fluidly to the reservoir 41 via the side through hole 414, so that the dough 20 can be conveyed into the reservoir 41. In this embodiment, the top edge 415 of the surrounding wall 412 is concaved downwardly so as to correspond to the curved profile of the outer heating surface 32.

The surrounding wall 412 further has an inner face provided with a limiting rail 418 below the top edge 415. The limiting rail 418 has a curved shape corresponding to the profile of the top edge 415, and is spaced apart from the top edge 415 at a predetermined distance (D) (see FIG. 5A).

Figure 6:
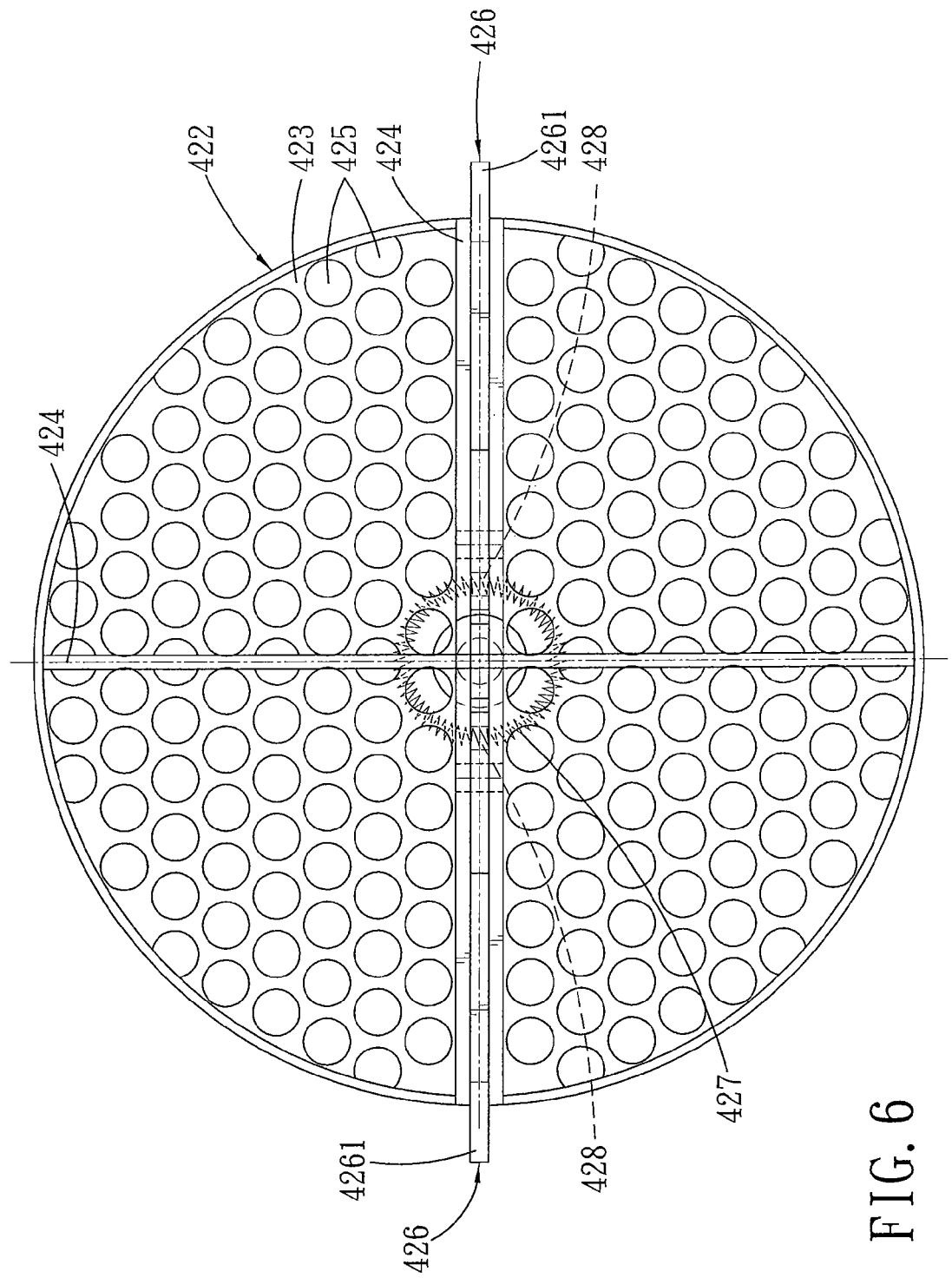
FIG. 6 is a schematic top view of an applying disk of the first preferred embodiment.
Figure 7:
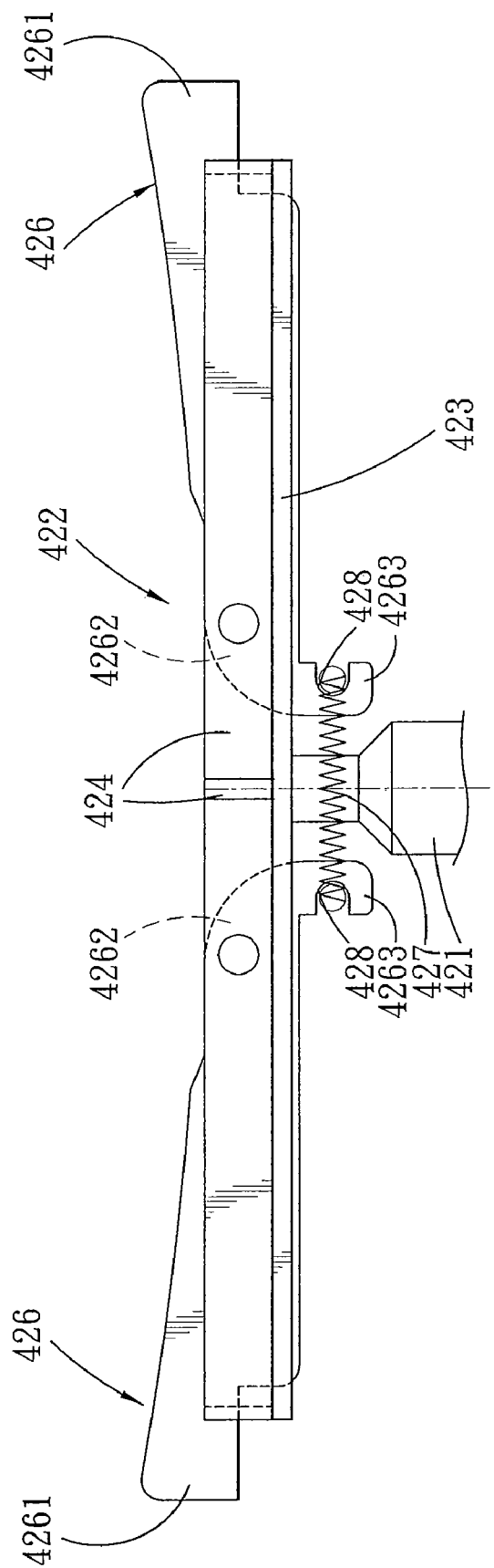
FIG. 7 is a schematic side view of the applying disk.

With reference to FIGS. 3, 6, and 7, the rotary shaft 421 extends into the reservoir 41 through the central through hole 417. The applying disk 422 is connected to a top end of the rotary shaft 421, and is disposed inside the reservoir 41 and below the outer heating surface 32. The applying disk 422 includes a plate body 423, and two intersecting diametral bars 424 projecting upwardly from a top face of the plate body 423. The plate body 423 is provided with perforations 425 for extension of the dough 20 therethrough. In this embodiment, one of the diametral bars 424 is hollow, as best shown in FIG. 6. The applying disk 422 further has two radial swing plates 426 connected pivotally to and extending oppositely and upwardly from a middle part of the hollowed diametral bar 424 and engaged slidably to the limiting rail 418. Each radial swing plate 426 has a free upward end 4261 extending outwardly from an outer periphery of the plate body 423 to a level above the limiting rail 418, a pivot portion 4262 connected pivotally to the hollowed diametral bar 424 in proximity to the rotary shaft 421, and a lower end 4263 extending downwardly from the pivot portion 4262 and provided with an engaging groove 428.

A biasing element 427 interconnects the lower ends 4263 of the radial swing plates 426. In this embodiment, the biasing element 427 is a circular tension spring connected to the engaging grooves 428 in the lower ends 4263 of the radial swing plates 426 and biasing the radial swing plates 426 to turn upward, so that the free upward ends 4261 of the radial swing plates 426 abut against the limiting rail 418, as best shown in FIG. 3.

Figure 8:
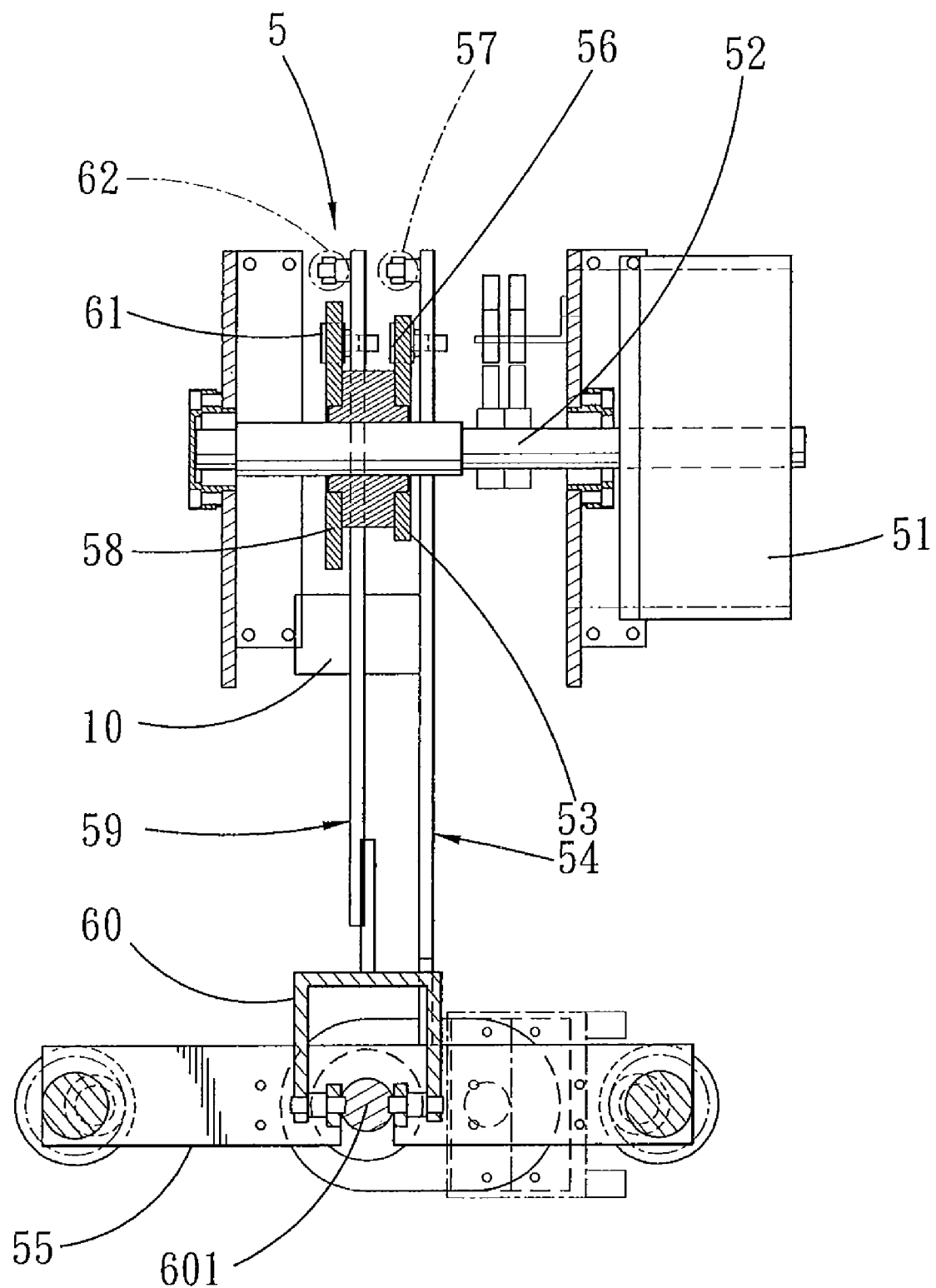
FIG. 8 is a schematic sectional top view of a drive unit of the first preferred embodiment.
Figure 9:
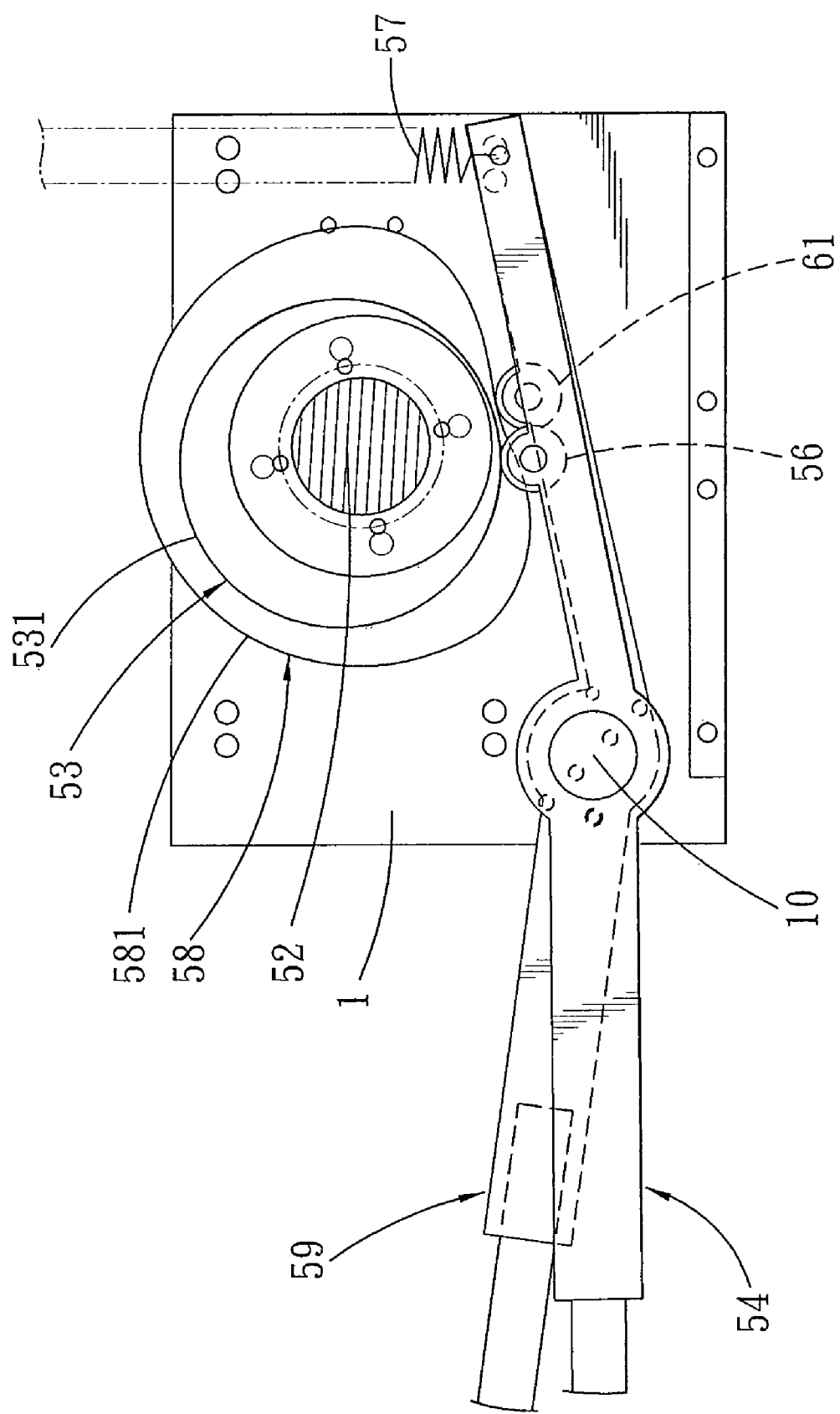
FIG. 9 is a fragmentary schematic side view of the drive unit.

With reference to FIGS. 3, 8, and 9, the drive unit 5 includes a first drive motor 51, a spindle 52 driven by the first drive motor 51 to rotate, a first cam 53 journalled to and rotatable along with the spindle 52, a first driven rod 54 connected pivotally to a shaft 10 of the machine body 1, and a first movable frame 55 connected pivotally to a front end of the first driven rod 54. The first driven rod 54 is provided with a first driven wheel 56 to contact an outer edge 531 of the first cam 53. A first tension spring 57 has two opposite ends connected respectively to the machine body 1 and a rear end of the first driven rod 54 for providing the first driven rod 54 with a restoring force. The first movable frame 55 is mounted to a fixed plate 11 of the machine body 1, and is movable upwardly and downwardly relative to the fixed plate 11. The reservoir 41 is mounted to a top end of the first movable frame 55. The first cam 53 can drive the first driven rod 54 to move upwardly and downwardly about the shaft 10, so that the first movable frame 55 can move the reservoir 41 between non-contact and contact positions. In the non-contact position, as shown in FIG. 3, the top edge 415 of the reservoir 41 is spaced below the outer heating surface 32. In the contact position, as shown in FIG. 11, the top edge 415 of the reservoir 41 moves upward to contact and abut against the outer heating surface 32, so that the dough 20 that is applied onto the outer heating surface 32 is sealed between the reservoir 41 and the outer heating surface 32.

The drive unit 5 further includes a second cam 58 journalled to and rotatable along with the spindle 52, a second driven rod 59 connected pivotally to the shaft 10, and a second movable frame 60 connected pivotally to a front end of the second driven rod 59. The second driven rod 59 is provided with a second driven wheel 61 to contact an outer edge 581 of the second cam 58. A second tension spring 62 has two opposite ends connected respectively to the machine body 1 and a rear end of the second driven rod 59 for providing the second driven rod 59 with a restoring force. The second movable frame 60 has a drive rod 601 connected to a bottom end of the rotary shaft 421. A drive gear set 63 may be driven by a second drive motor 64 so that the drive gear set 63 can drive the drive rod 601 and the rotary shaft 421 to rotate. As a result, the applying disk 422 can be disposed in a continuous rotation state along with the rotary shaft 421. The second cam 58 can drive the second driven rod 59 to move upwardly and downwardly about the shaft 10, so that the second movable frame 60 can move the rotary shaft 421 upwardly and downwardly. The rotary shaft 421, in turn, can move the applying disk 422 between a pre-applying position (see FIG. 3) and an applying position (see FIG. 11). In the pre-applying position, the applying disk 422 is lowered into the reservoir 41 for dipping into the dough 20. In the applying position, the applying disk 422 is raised for applying the dough 20 to the outer heating surface 32.

With reference to FIGS. 3 and 9, during operation of the forming machine 100, when the outer edges 531, 581 of the first and second cams 53, 58 are in contact with the respective first and second driven wheels 56, 61, the reservoir 41 is in the non-contact position and the applying disk 422 is in the pre-applying position. At this time, the radial swing plates 426 abut against the limiting rail 418, and the dough 20 inside the reservoir 41 is pressed through the plate body 423 of the applying disk 422 so that a portion of the dough 20 extends through the perforations 425 and is disposed above the plate body 423.

Figure 10:
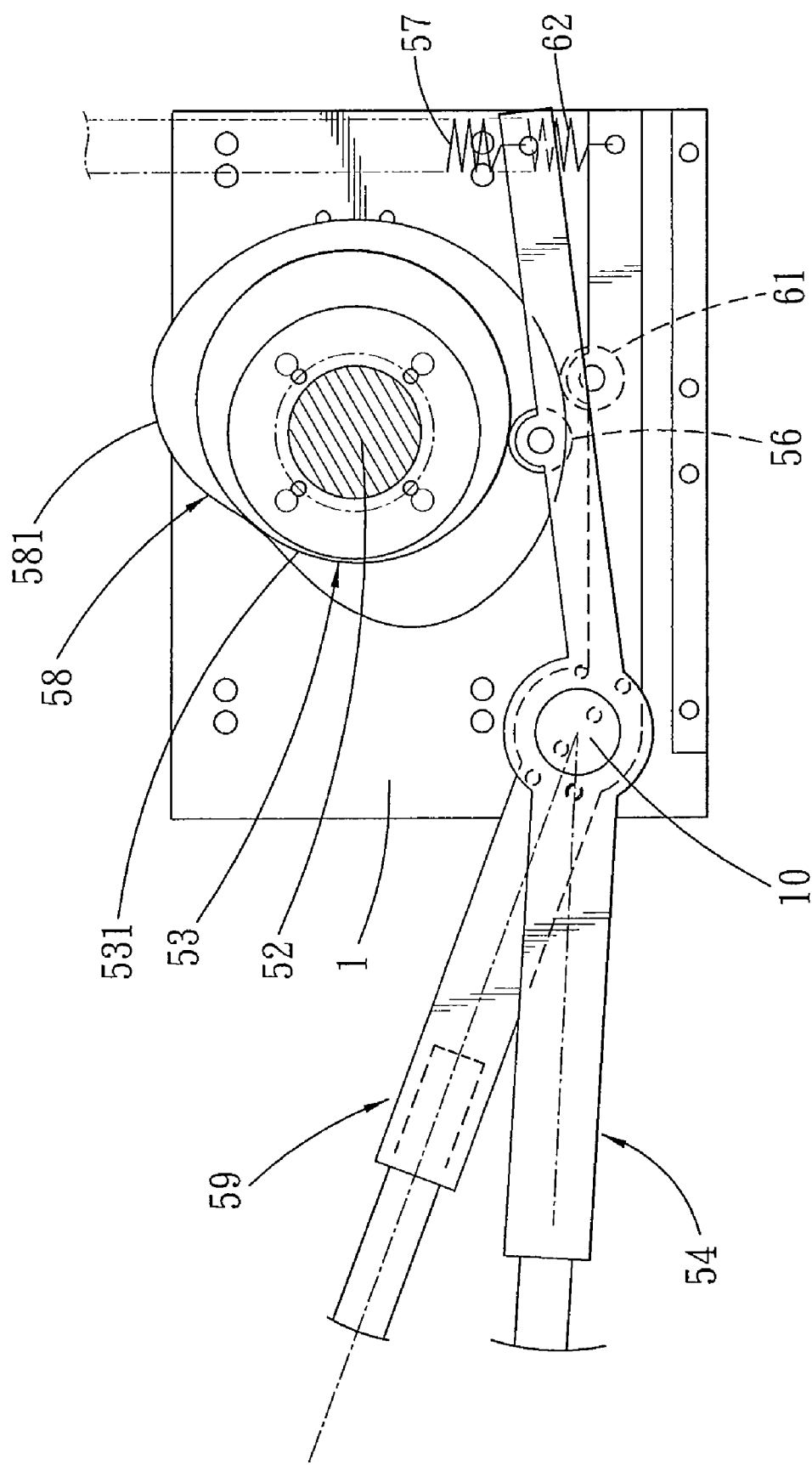
FIG. 10 is a view similar to FIG. 9, but illustrating first and second driven rods being pushed downwardly and respectively by first and second cams.
Figure 11:
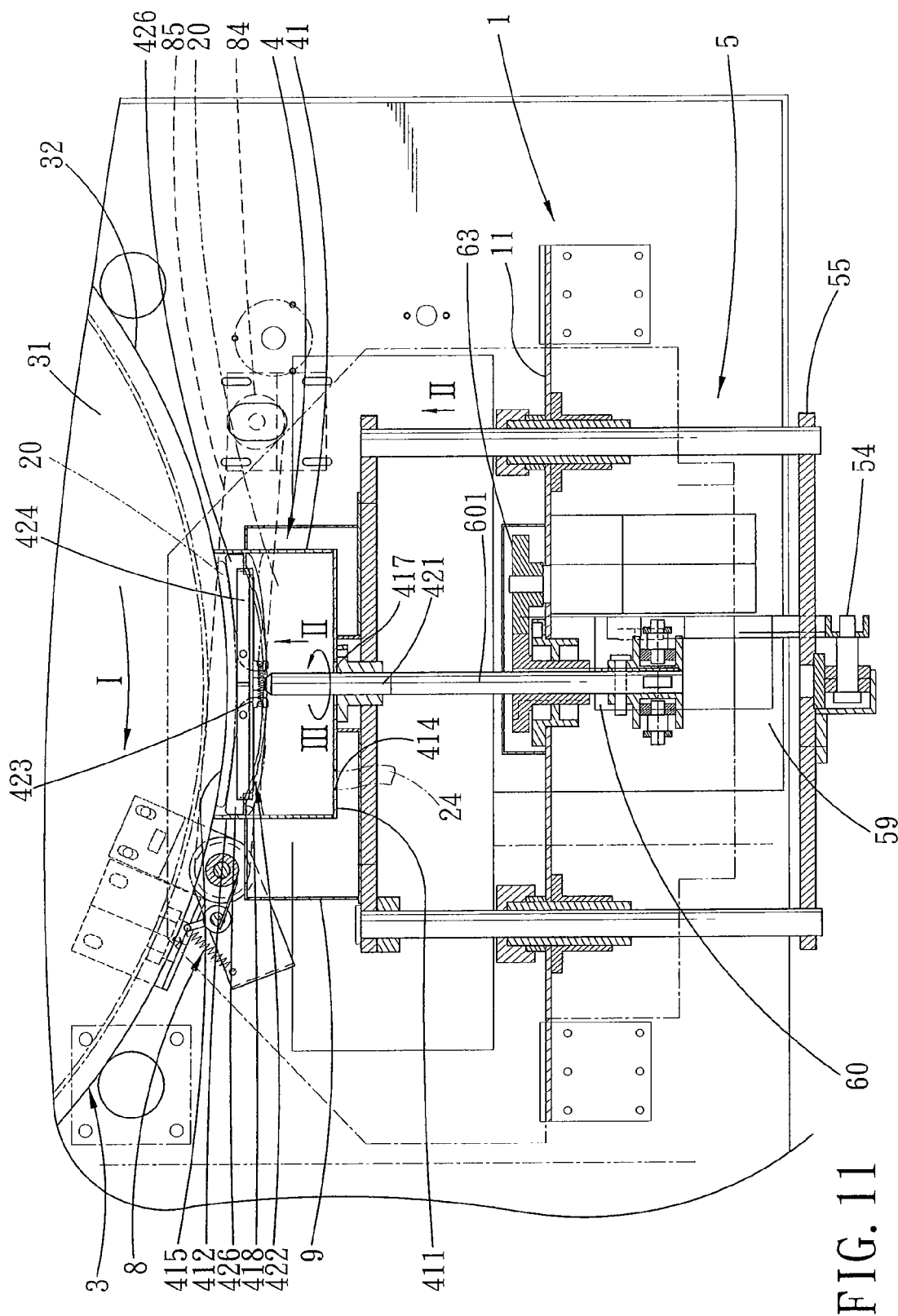
FIG. 11 is a view similar to FIG. 3, but illustrating the applying disk in an applying position.
Figure 12:
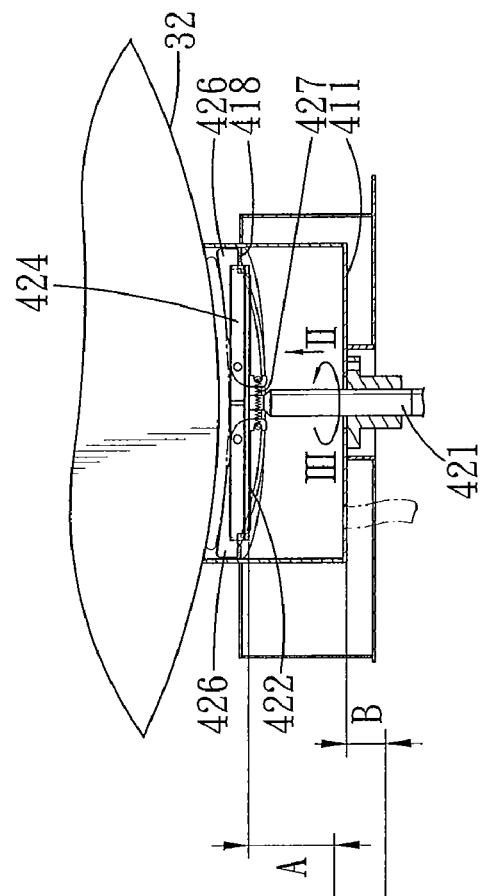
FIG. 12 illustrates height relations between the reservoir and the applying disk before and after contact with the drum.
Figure 12:
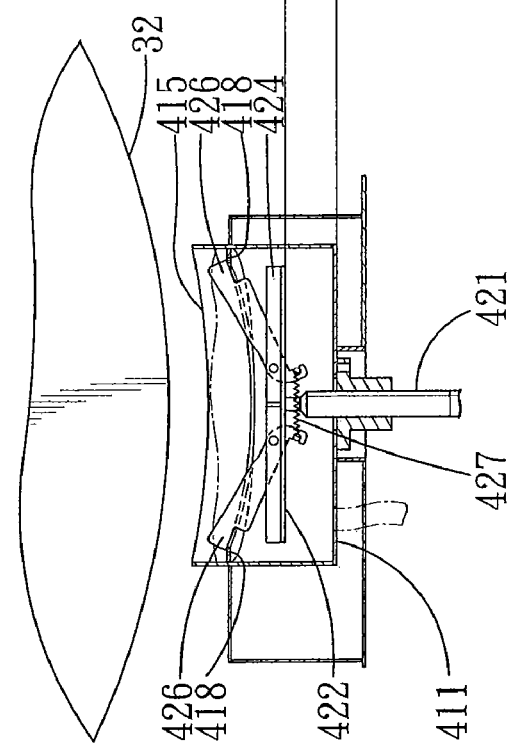

With reference to FIGS. 10, 11, and 12, when the spindle 52 rotates, the first and second cams 53, 58 are driven by the spindle 52 to rotate therealong. When the outer edges 531, 581 of the first and second cams 53, 58 are in contact with the respective first and second driven wheels 56, 61, the rear ends of the first and second driven rods 54, 59 are pressed downwardly, so that the front ends of the first and second driven rods 54, 59 move upwardly about the shaft 10. Since the outer edge 581 of the second cam 58 that is in contact with the second driven wheel 61 is farther from the spindle 52 than the outer edge 531 of the first cam 53 that is in contact with the first driven wheel 56, the applying disk 422 is moved from the pre-applying position to the applying position at a height (A) which is greater than a height (B) that the reservoir 41 moved from the non-contact position to the contact position. Hence, when the front ends of the first and second driven rods 54, 59 move upwardly, the reservoir 41 and the applying disk 422 are driven to move upwardly therealong, as shown by the arrow (II) in FIG. 11, to the contact position and the applying position, respectively and simultaneously. At this time, the applying disk 422 presses the portion of the dough 20 onto the outer heating surface 32 of the drum 31, and the rest of the dough 20 falls back to the reservoir 41. The aforesaid steps are repeatedly performed to continuously apply the dough 20 in the reservoir 41 onto the outer heating surface 32.

Figure 13:
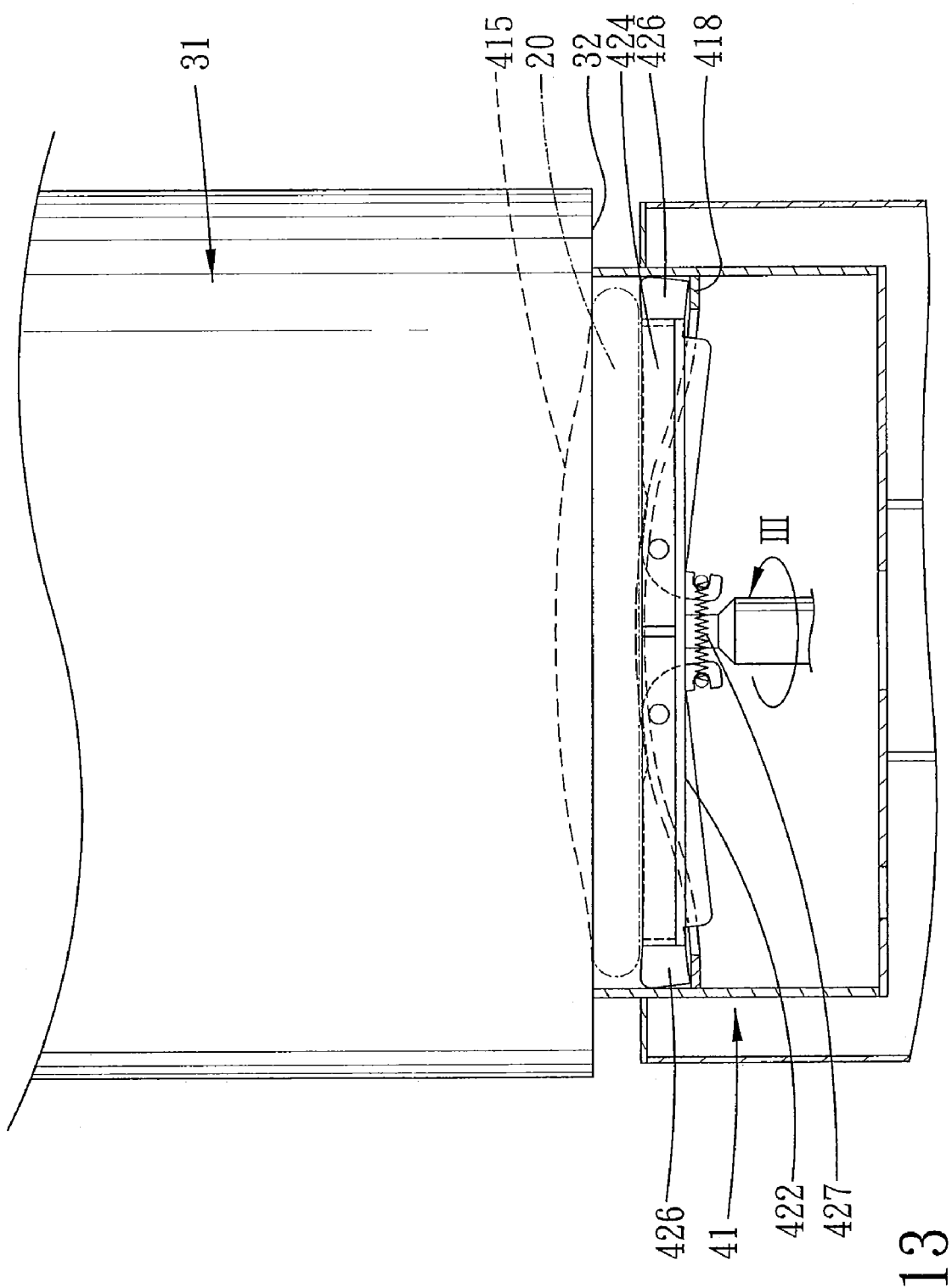
FIG. 13 is a fragmentary enlarged sectional view of the first preferred embodiment, illustrating the reservoir in a contact position and the applying disk in the applying position.
Figure 14:
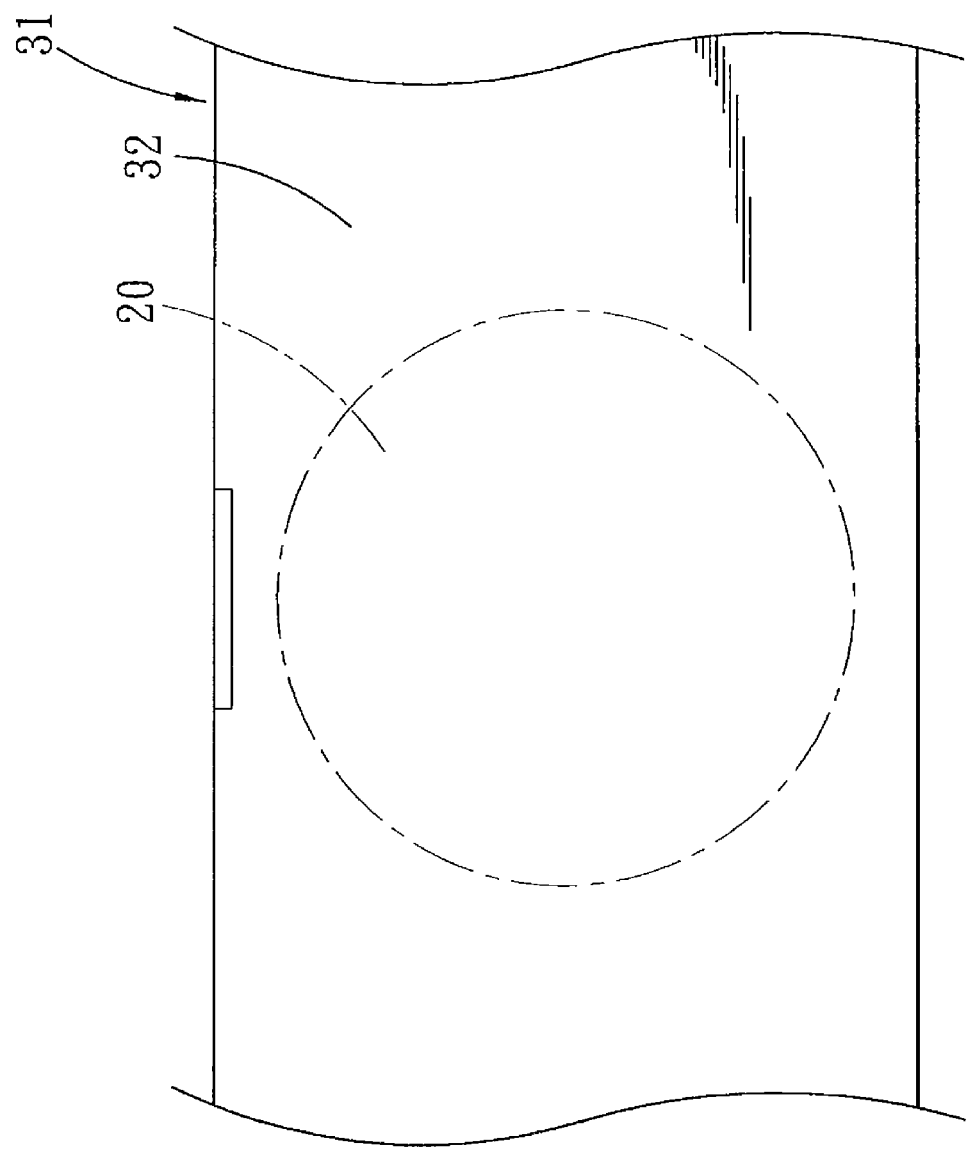
FIG. 14 is a fragmentary enlarged schematic view of the first preferred embodiment, illustrating the dough applied to an outer heating surface of the drum.

With reference to FIGS. 11 and 13, when the applying disk 422 is in the applying position, the free upward ends of the radial swing plates 426 slide rotatingly and respectively over two uppermost ends of the limiting rail 418, so that top ends of the radial swing plates 426 and a top end of the hollowed diametral bar 424 form a curved shaped corresponding to the curved profile of the outer heating surface 32. When the radial swing plates 426 slide rotatingly and respectively over two lowermost points of the limiting rail 418, the top ends of the radial swing plates 426 and the top end of the hollowed diametral bar 424 are flush with each other to correspond to a level shape of the outer heating surface 32 shown in FIG. 13. When the applying disk 422 rotates in a direction shown by the arrow (III) in FIG. 13, the radial swing plates 46 can follow the curved configuration of the outer heating surface 32, so that the radial swing plates 426 can be maintained near the outer heating surface 32 during applying of the portion of the dough 20 to the outer heating surface 32. Hence, through the short stay of the dough 20 on the applying disk 422 for 1-2 seconds, the radial swing plates 426 and the diametral bars 424 can quickly apply the dough 20 uniformly on the outer heating surface 32, as shown in FIG. 14. Afterwards, the drum 31 is rotated intermittently along the direction (I) shown in FIG. 11. The reservoir 41 and the applying disk 422 are then moved quickly and downwardly at the same time away from the outer heating surface 32 to the respective non-contact and pre-applying positions. The reservoir 41 and the applying disk 422 are continuously operated to proceed with the applying operation of the dough 20 in the reservoir 41.

Figure 15:
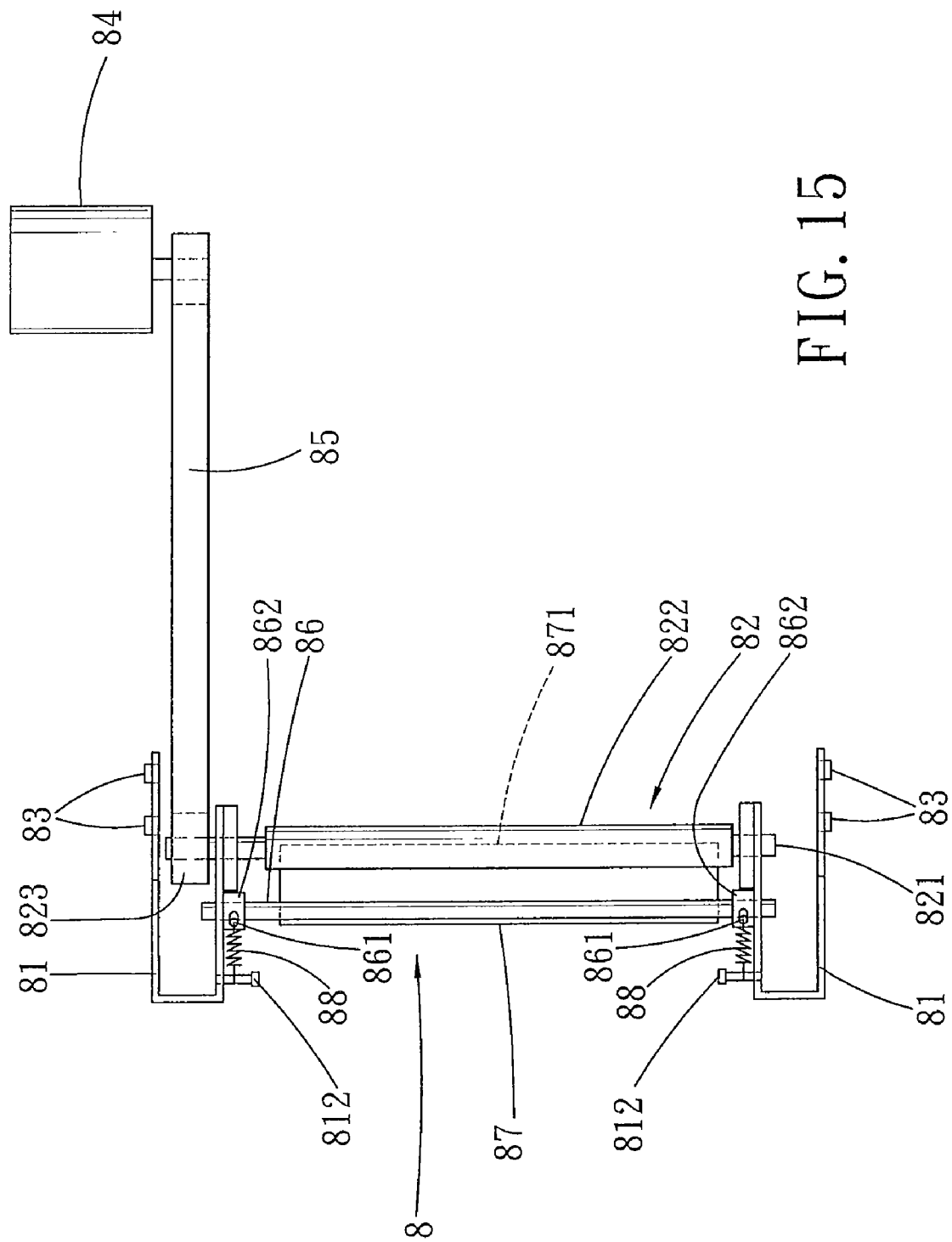
FIG. 15 is an enlarged schematic top view of a thickness control unit of the first preferred embodiment.
Figure 16:
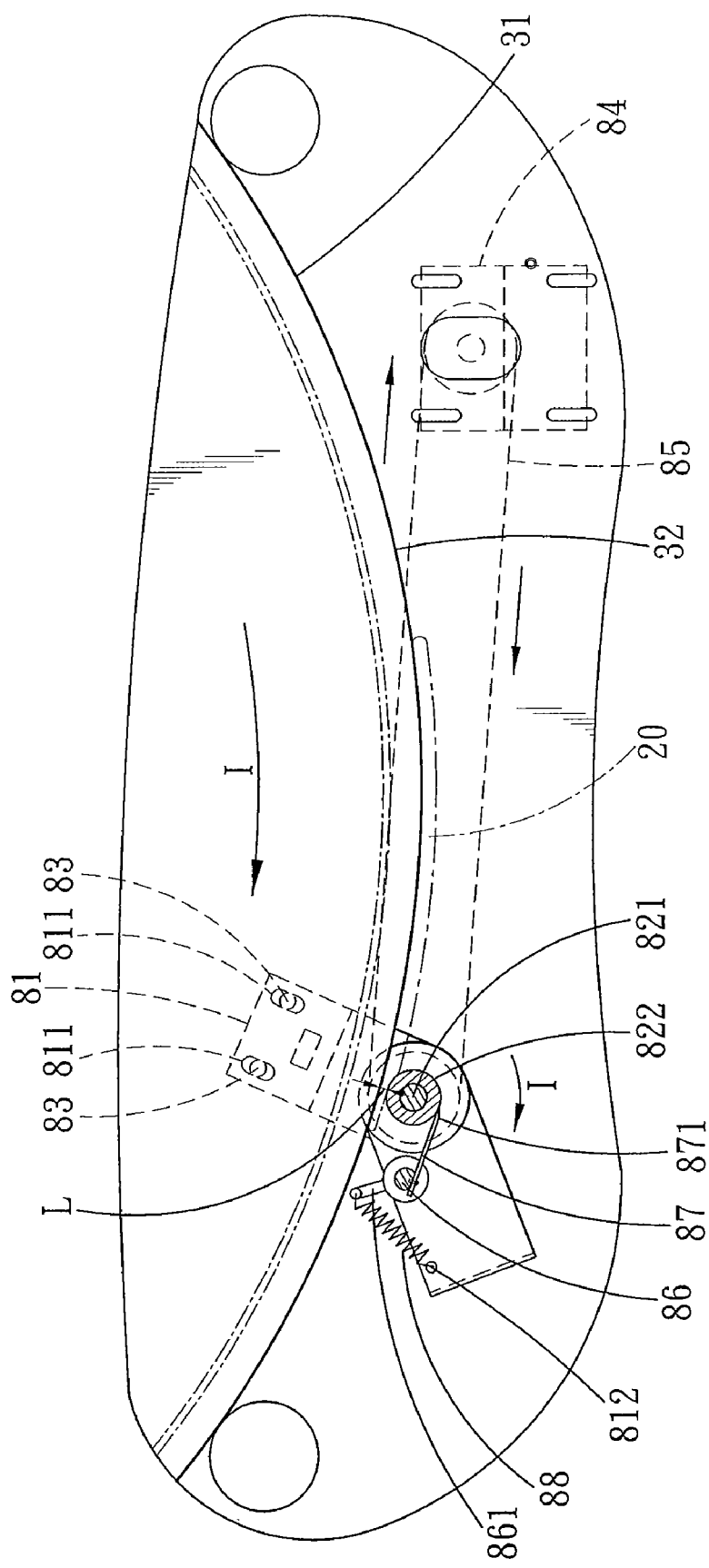
FIG. 16 is a fragmentary enlarged schematic side view of the first preferred embodiment, illustrating how a roller of the thickness control unit presses the dough.
Figure 17:
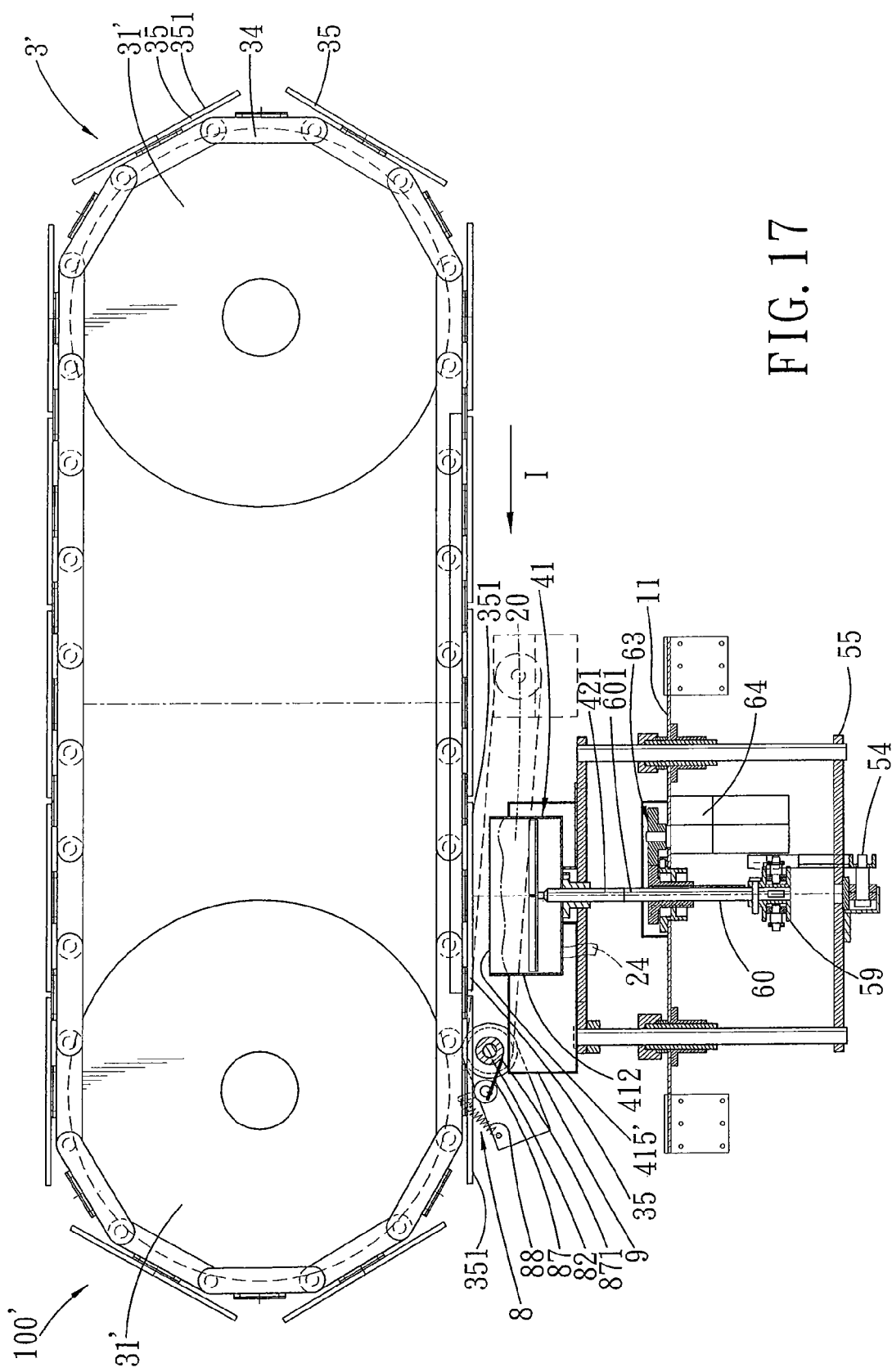
FIG. 17 is a partly sectional schematic side view of a forming machine according to the second preferred embodiment of this invention.
Figure 18:
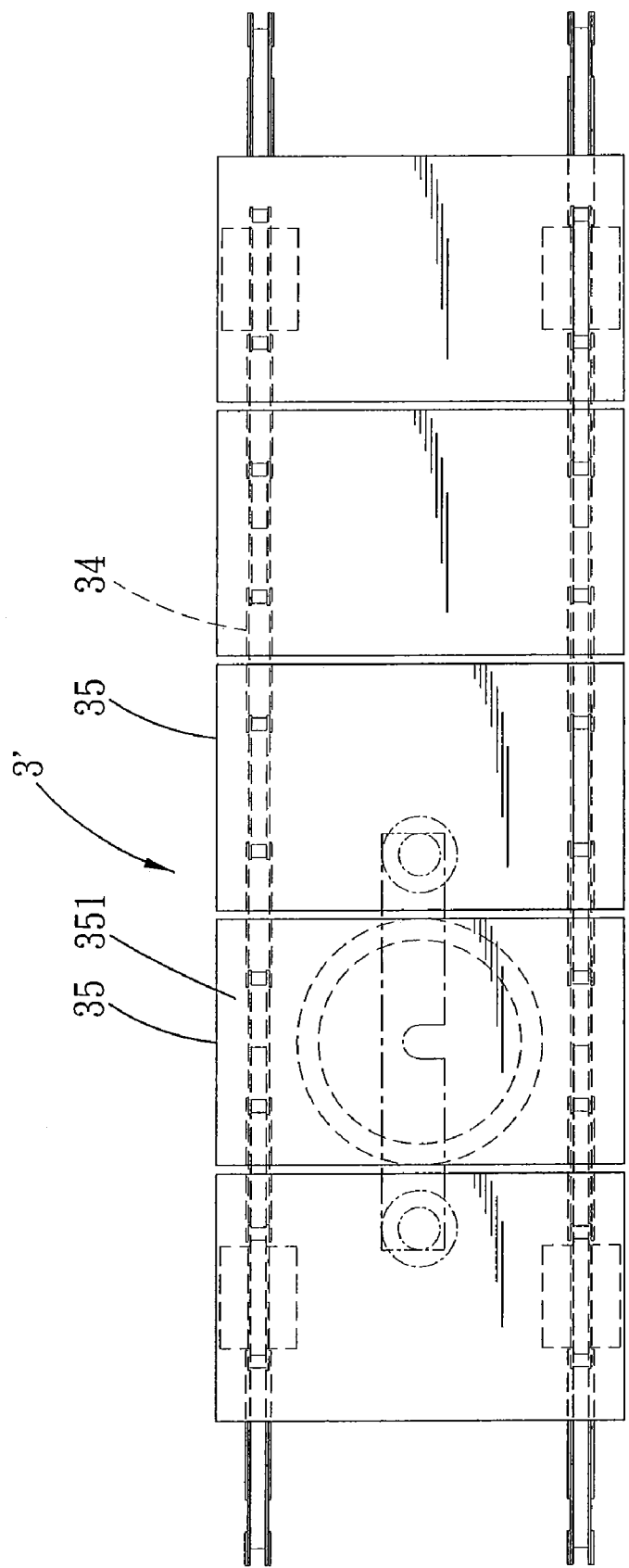
FIG. 18 is a schematic top view of a heating unit of the second preferred embodiment.
Figure 19:
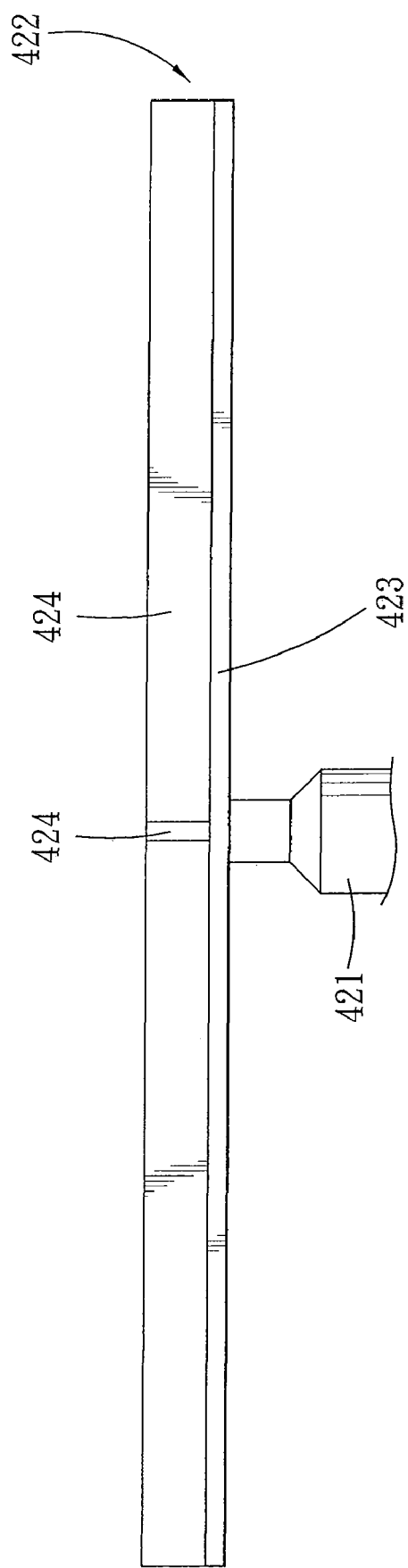
FIG. 19 is a schematic side view of an applying disk of the second preferred embodiment.

With reference to FIGS. 15 and 16, the thickness control unit 8 is adapted to control the thickness of the dough 20 that is applied to the outer heating surface 32, and includes two adjustment seats 81 provided respectively on front and rear ends of the machine body 1, a roller 82, a motor 84, and a transmission belt 85. Each adjustment seat 81 has two elongated guide grooves 811. Four positioning screws 83 extend respectively through the guide grooves 811 and engage with the machine body 1 so as to secure the adjustment seats 81 to the machine body 1 (see FIG. 1). The roller 82 rotates about an axis parallel to the horizontal axis of the drum 31, and rotates in a direction similar to the rotating direction (I) of the drum 31. The roller 82 includes a pivot shaft 821 having two opposite ends journalled respectively to the adjustment seats 81, an outer press face 822 spaced apart from the outer heating surface 32 at a predetermined distance and adapted to press the dough 20 to a uniform thickness, and a drive wheel 823 sleeved on one end of the pivot shaft 821 in proximity to the rear end of the machine body 1. The transmission belt 85 is sleeved on the motor 84 and the drive wheel 823. The motor 84 actuates the transmission belt 85 to rotate the roller 82 along the rotating direction (I) of the drum 31.

The positioning screws 83 are operable between a loosened state and a tightened state. In the loosened state, the adjustment seats 81 are permitted to move relative to the positioning screws 83 so that a distance (L) between the roller 82 and the outer heating surface 32 can be adjusted, In the tightened position, the movement of the adjustment seats 81 relative to the positioning screws 83 is prevented so that the distance (L) between the roller 82 and the outer heating surface 32 can be fixed.

The thickness control unit 8 further includes a scraper spindle 86, a scraper 87, and two tension springs 88. The scraper spindle 86 has two opposite ends journalled respectively to the adjustment seats 81, two sleeve members 862 sleeved respectively on the ends of the scraper spindle 86, and two radial arms 861 projecting outwardly and respectively from the sleeve members 862. The scraper 87 is mounted to and projects radially from the scraper spindle 86, and has a blade portion 871 abutting against the outer press face 822 of the roller 82. Each tension spring 88 has two opposite ends connected respectively to a projection 812 of one of the adjustment seats 81 and one of the radial arms 861 of the scraper spindle 86. Each tension spring 88 can exert a pulling force on the scraper spindle 86, so that the blade portion 871 abuts tightly against the outer press face 822 of the roller 82. Alternatively, only one tension spring 88 may be provided to pull the blade portion 871 to abut against the outer press face 822 of the roller 82. However, the two tension springs 88 disclosed in this embodiment can provide a uniform pulling force on the scraper spindle 86, so that the blade portion 871 of the scraper 87 can abut tightly against the outer press face 822 of the roller 82.

To use the forming machine 100, the positioning screws 83 are first loosened so as to move the adjustment seats 81 relative to the positioning screws 83 through the guide grooves 811 to obtain a desired distance (L) between the outer press face 822 of the roller 82 and the outer heating surface 32 of the drum 31, after which the positioning screws 83 are tightened. Since the distance (L) between the outer press face 822 of the roller 82 and the outer heating surface 32 is fixed, when the dough 20 on the outer heating surface 32 passes through the roller 82, the outer press face 822 of the roller 82 presses flatly the dough 20 to form a circular thin dough sheet having a thickness similar to that of the distance (L). Hence, thin dough sheets formed by passing the dough 20 through the outer press face 822 have a uniform thickness. Further, if there is dough residue adhered on the outer press face 822 of the roller 82, the blade portion 871 can scrape off the dough residue from the outer press face 822. The dough residue scraped from the roller 82 falls into a recycling groove 9 (see FIGS. 3 and 11) and is sent back to the feeder 21 (see FIG. 1) through a piping (not shown) for reuse.

The circular thin dough sheets that pass through and that are pressed by the roller 82 are heated for a length of time, and are rotated to a position where a scraper 71 (see FIG. 1) is disposed. The scraper 71 scrapes off the thin dough sheets one at a time from the outer heating surface 32, and each thin dough sheet falls onto a conveying belt 72 (see FIG. 1) for a collecting operation.

Hence, it is apparent that through the configurations of the reservoir 41 and the applying disk 422, and through the presence of the thickness control unit 8, the forming machine 100 of the present invention can produce thin dough sheets of uniform thicknesses and sizes. The thin dough sheets can be used as spring roll wrappers, but are not limited in this regard.

With reference to FIGS. 17 to 20, a forming machine 100' according to the second preferred embodiment of the present invention is shown to be similar to the first preferred embodiment. The difference between the first and second preferred embodiments resides in the configurations of the heating unit 3' and the dough applying unit 4. The heating unit 3' includes two drums 31', a conveying belt 34 driven by the drums 31' to rotate intermittently along the rotating direction (I) of the drums 31', and a plurality of spaced-apart heating plates 35 provided on the conveying belt 34. Each heating plate 35 has an outer heating surface 351 that is flat. The top edge 415' of the surrounding wall 412 of the reservoir 41 extends in a plane similar to that of the outer heating surface 351, and is therefore flat. Further, each diametral bar 424 has a flat top face. Moreover, the radial swing plates 426 (see FIGS. 6 and 7) are dispensed herewith.

Figure 20:
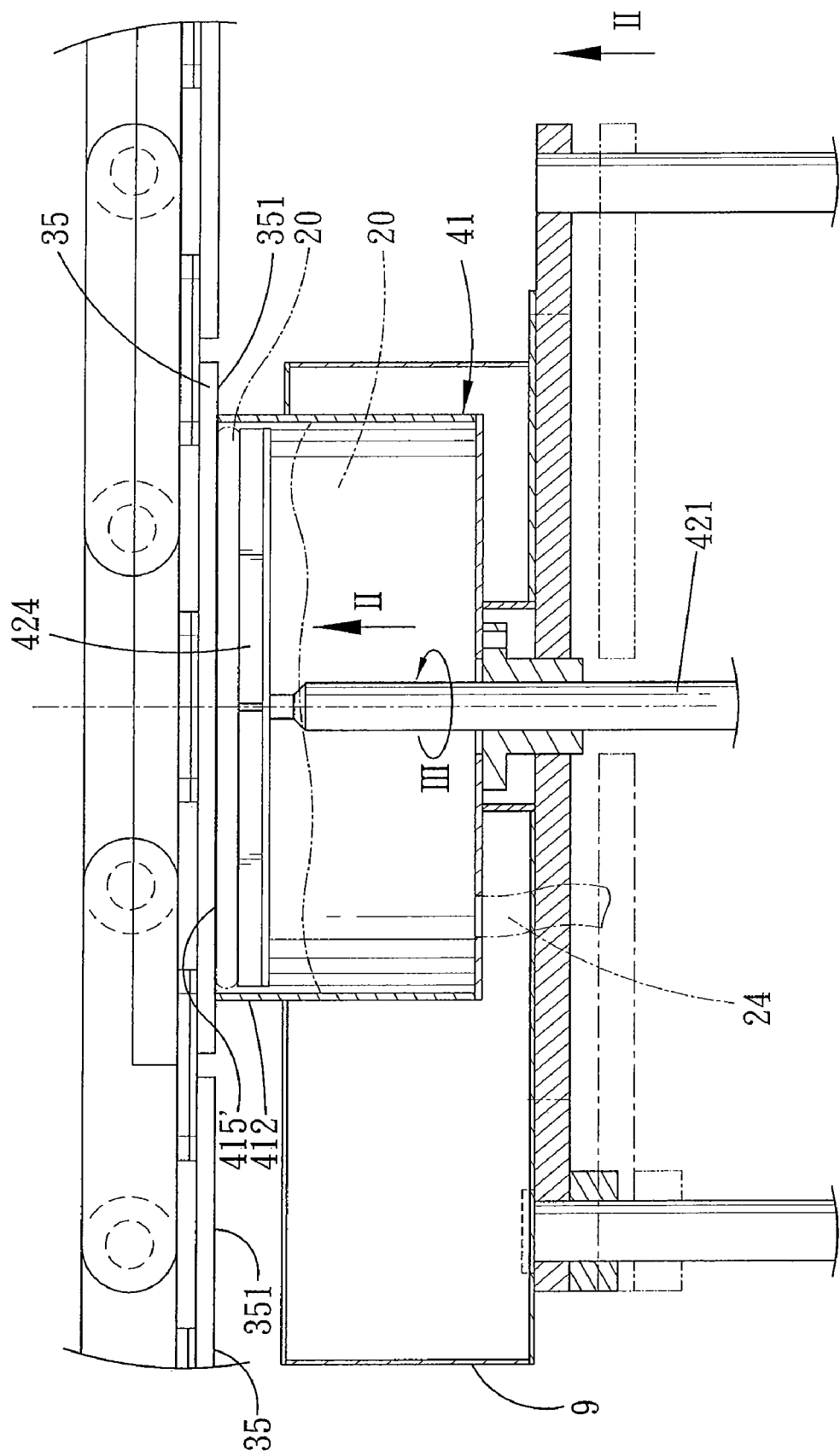
FIG. 20 is a fragmentary enlarged sectional view of the second preferred embodiment, illustrating the reservoir in a contact position and the applying disk in an applying position.

When the reservoir 41 is in the contact position, as shown in FIG. 20, the top edge 415' of the surrounding wall 412 abuts completely against the outer heating surface 351 of a corresponding heating plate 35. Through the diametral bars 424 of the applying disk 422, the dough 20 can be applied uniformly on the outer heating surface 351 of the corresponding heating plate 35. The conveying belt 34 drives each heating plate 35 to rotate intermittently, so that the reservoir 41 and the applying disk 422 can continue the applying operation of the dough 20 on the outer heating surface 351 of the corresponding heating plate 35.

From the aforesaid description of the two embodiments, it is apparent that through the reciprocating movement of the reservoir 41 between the non-contact position and the contact position, and through the reciprocating movement of the applying disk 422 between the pre-applying position and the applying position, the dough 20 can be uniformly and quickly coated on the outer heating surface 32, 351 of the heating unit 3, 3', so that mass production of the thin dough sheets are made possible.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A forming machine for forming dough into a sheet comprising:
    a heating unit including a drum rotatable intermittently about a horizontal axis and having an outer heating surface; and
    a dough applying unit including
        a reservoir disposed below said drum, adapted to contain the dough, and having a surrounding wall, and a bottom wall connected to a bottom end of said surrounding wall, said surrounding wall having a top edge that can contact said outer heating surface and that has a profile conforming to that of said outer heating surface, said bottom wall having a through hole, said reservoir being movable between a non-contact position, where said top edge is spaced below said outer heating surface, and a contact position, where said top edge moves upward to abut against said outer heating surface,
        an applying disk disposed inside said reservoir and below said outer heating surface and having perforations, and
        a rotary shaft extending into said reservoir through said through hole to rotate said applying disk and movable upwardly or downwardly to raise or lower said applying disk,
        said applying disk being movable between a pre-applying position, where said applying disk is lowered into said reservoir for dipping into the dough, and an applying position, where said applying disk is raised for applying the dough to said outer heating surface.

2. The forming machine of claim 1, wherein a height that said applying disk is moved from said pre-applying position to said applying position is greater than a height that said reservoir is moved from said non-contact position to said contact position.

3. The forming machine of claim 1, wherein said outer heating surface is flat, and said top edge of said surrounding wall extends in a plane similar to that of said outer heating surface.

4. The forming machine of claim 3, wherein said applying disk includes a plate body having said perforations, and a diametral bar projecting from a top face of said plate body and having a flat top face adapted to spread the dough uniformly on said outer heating surface.

5. The forming machine of claim 1, wherein said outer heating surface has a curved profile, and said top edge of said surrounding wall is concaved downwardly corresponding to said curved profile of said outer heating surface.

6. The forming machine of claim 5, wherein said applying disk includes a plate body having said perforations, a hollow diametral bar projecting from a top face of said plate body, and two radial swing plates connected pivotally to a middle part of said diametral bar and extending oppositely and upwardly from said diametral bar.

7. The forming machine of claim 6, wherein said surrounding wall has an inner surface provided with a limiting rail below said top edge, said limiting rail having a curved shape corresponding to a profile of said top edge, each of said radial swing plates having a free upward end extending to a level above said limiting rail, said radial swing plates being engaged slidably to said limiting rail and being slidable over said limiting rail when said applying disk is rotated.

8. The forming machine of claim 7, wherein said dough applying unit further includes a biasing element biasing said radial swing plates to turn upward.

9. The forming machine of claim 8, wherein said free upward ends of said radial swing plates extend outwardly from an outer periphery of said plate body, said radial swing plates further having pivot portions connected pivotally to said diametral bar in proximity to said rotary shaft, and lower ends extending downwardly and respectively from said pivot portions, said biasing element interconnecting said lower ends of said radial swing plates.

10. The forming machine of claim 9, wherein said lower ends of said radial swing plates are provided respectively with an engaging groove, said biasing element being a circular spring connected to said engaging grooves in said lower ends of said radial swing plates.

11. The forming machine of claim 1, further comprising a thickness control unit adapted to control the thickness of the dough that is applied to said outer heating surface and including a roller that rotates about an axis parallel to said horizontal axis of said drum, that rotates in a direction similar to a rotating direction of said drum, and that has an outer press face spaced apart from said outer heating surface at a predetermined distance and adapted to press the dough to a uniform thickness.

12. The forming machine of claim 11, wherein said thickness control unit further includes a scraper abutting against said outer press face of said roller and adapted to scrape off residue of the dough from said roller.

13. The forming machine of claim 12, further comprising a machine body, said thickness control unit further including two adjustment seats, and two positioning screws to secure said adjustment seats to said machine body, said roller having two opposite ends journalled respectively to said adjustment seats, each of said adjustment seats having an elongated guide groove, said positioning screws extending respectively through said guide grooves in said adjustment seats and engaging with said machine body, said positioning screws being operable between a loosened state to permit movement said adjustment seats relative to said positioning screws so that a distance between said roller and said outer heating surface can be adjusted, and a tightened position to prevent movement of said adjustment seats relative to said positioning screws so that the distance between said roller and said outer heating surface can be fixed.

14. The forming machine of claim 13, wherein said thickness control unit further includes a scraper spindle and a tension spring, said scraper spindle having two opposite ends journalled respectively to said adjustment seats, two sleeve members sleeved respectively on said ends of said scraper spindle, and two radial arms projecting outwardly and respectively from said sleeve members, said scraper being mounted to and projecting radially from said scraper spindle, said tension spring having two opposite ends connected respectively to one of said adjustment seats and one of said radial arms, and biasing said scraper to abut against said outer press face of said roller.

15. The forming machine of claim 12, wherein said thickness control unit further includes a motor, and a transmission belt sleeved around said motor and a corresponding end of said roller, said motor actuating said transmission belt to rotate said roller along the rotating direction of said drum.

* * * * *